(12) United States Patent
Sandhu et al.

(10) Patent No.: US 9,923,610 B2
(45) Date of Patent: Mar. 20, 2018

(54) SELECTIVE USAGE OF ANTENNAS FOR IMPROVED CALL PERFORMANCE

(71) Applicant: QUALCOMM Incorporated, San Diego, CA (US)

(72) Inventors: Manjinder Singh Sandhu, Poway, CA (US); Madhusudan Kinthada Venkata, San Diego, CA (US); Siva Kumar Jujaray, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/263,721

(22) Filed: Sep. 13, 2016

(65) Prior Publication Data

US 2017/0126288 A1 May 4, 2017

Related U.S. Application Data

(60) Provisional application No. 62/248,267, filed on Oct. 29, 2015.

(51) Int. Cl.
*H04B 7/04* (2017.01)
*H04B 17/318* (2015.01)
(Continued)

(52) U.S. Cl.
CPC ............ *H04B 7/04* (2013.01); *H04B 17/318* (2015.01); *H04L 47/29* (2013.01); *H04W 28/0268* (2013.01)

(58) Field of Classification Search
CPC .. H04B 7/0814; H04B 17/318; H04B 7/0608; H04B 7/0808; H04B 7/0877; H04B 7/0811; H04B 7/0825; H04B 7/0871; H04B 17/007; H04B 17/008; H04B 17/26; H04B 17/29; H04B 17/309; H04B 17/382;
(Continued)

(56) References Cited

U.S. PATENT DOCUMENTS 8,761,701 B2 6/2014 Ramasamy et al.
9,287,954 B2 3/2016 Ramkumar et al.
(Continued)

OTHER PUBLICATIONS

International Search Report and Written Opinion—PCT/US2016/051681—ISA/EPO—Nov. 23, 2016.

*Primary Examiner* — Golam Sorowar
(74) *Attorney, Agent, or Firm* — Dalei Dong; Arent Fox, LLP

(57) ABSTRACT

An apparatus for selective usage of antennas for measurement purposes is provided. When the signal strength of the primary antenna is less than a signal strength threshold or the signal quality of the primary antenna is less than a signal quality threshold, the apparatus may determine at least one of whether a first difference between the signal strength of the primary antenna and the diversity antenna satisfies a first criteria or whether a second difference between the signal quality of the primary antenna and the diversity antenna satisfies a second criteria. When at least one of the first difference satisfies the first criteria or the second difference satisfies the second criteria, the apparatus may calculate the signal strength and signal quality of the diversity antenna for measurement evaluations and path-loss calculation based on the signal strength and signal quality of the primary antenna.

18 Claims, 7 Drawing Sheets

(51) Int. Cl.
*H04L 12/801* (2013.01)
*H04W 28/02* (2009.01)

(58) Field of Classification Search
CPC .... H04B 1/006; H04B 1/0458; H04B 1/1009;
H04W 36/0088; H04W 52/0254; H04W
88/06; H04W 16/28; H04W 24/10; H04W
28/0221; H04W 28/06; H04W 36/0061;
H04W 36/0083; H04W 36/30; H04W
36/32; H04W 52/0225; H04W 52/0229;
H04W 52/0232; H04W 52/0274; H04W
52/242; H04L 1/0027; H04L 1/1864;
H04L 25/03891; H04L 5/001; H04L
5/0023; H04L 5/0035; H04L 5/0051;
H04L 5/0053; H04L 5/0094
See application file for complete search history.

(56) References Cited

U.S. PATENT DOCUMENTS

| | | | |
|---|---|---|---|
| 9,356,672 B2 | 5/2016 | Szini et al. | |
| 2004/0219959 A1* | 11/2004 | Khayrallah | H04B 7/0877 |
| | | | 455/575.7 |
| 2012/0009881 A1* | 1/2012 | Kawasaki | H01Q 1/242 |
| | | | 455/67.11 |
| 2014/0228026 A1 | 8/2014 | Venkatachari et al. | |
| 2014/0323141 A1* | 10/2014 | Boos | H04B 7/02 |
| | | | 455/452.1 |
| 2015/0179043 A1 | 6/2015 | Gude et al. | |
| 2015/0257173 A1* | 9/2015 | You | H04L 1/1864 |
| | | | 370/330 |
| 2016/0173172 A1 | 6/2016 | Greene | |

\* cited by examiner

SELECTIVE USAGE OF ANTENNAS FOR IMPROVED CALL PERFORMANCE

CROSS-REFERENCE TO RELATED APPLICATION(S)

This application claims the benefit of U.S. Provisional Application Ser. No. 62/248,267, entitled "SELECTIVE USAGE OF ANTENNAS FOR IMPROVED CALL PERFORMANCE" and filed on Oct. 29, 2015, which is expressly incorporated by reference herein in its entirety.

BACKGROUND

Field

The present disclosure relates generally to communication systems, and more particularly, to the usage of antennas.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

A UE may have a primary antenna and a diversity antenna. Poor call performance may result when the UE antennas are not balanced.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one scenario, the signal received at the primary antenna may be weaker than the signal received at the diversity antenna. The UE may report signal measurements at the diversity antenna in measurement report to eNB. Because the signal received at the diversity antenna is stronger than the signal received at the primary antenna, the UE may get handover to such a cell even though the signal received at the primary antenna is weak. In this scenario, the UE may camp on a new cell based on the signal measurements of the diversity antenna. Once camped, the UE may fail uplink communication due to power limitation on the primary antenna. This may result in handover or call failures at cell edge.

In an aspect of the disclosure, a method of selective usage of antennas for measurement purposes is provided. The method may measure a first set of metrics of a primary antenna and a second set of metrics of a diversity antenna. The method may determine, when at least one metric of the first set of metrics is less than a corresponding threshold, whether at least one difference between the first set of metrics and the second set of metrics satisfies a corresponding criteria. The method may calculate the second set of metrics of the diversity antenna based on the first set of metrics of the primary antenna when the at least one difference is determined to be satisfying the corresponding criteria.

In one configuration, the first set of metrics may include a first signal strength and a first signal quality of the primary antenna, and the second set of metrics may include a second signal strength and a second signal quality of the diversity antenna. In one configuration, the at least one metric may be the first signal strength of the primary antenna and the corresponding threshold may be a signal strength threshold. In one configuration, the at least one metric may be the first signal quality of the primary antenna and the corresponding threshold may be a signal quality threshold.

In one configuration, the at least one difference may be a difference between the first signal strength and the second signal strength, and the corresponding criteria may be a signal strength difference criteria. In such a configuration, the signal strength difference criteria may be determined to be satisfied when the second signal strength of the diversity antenna is stronger than the first signal strength of the primary antenna for more than a signal strength delta threshold.

In one configuration, the at least one difference may be a difference between the first signal quality and the second signal quality, and the corresponding criteria may be a signal quality difference criteria. In such a configuration, the signal quality difference criteria may be determined to be satisfied when the second signal quality of the diversity antenna is stronger than the first signal quality of the primary antenna for more than a signal quality delta threshold.

In one configuration, the first signal strength of the primary antenna and the second signal strength of the diversity antenna may be measured by reference signal received power (RSRP), and the first signal quality of the primary antenna and the second signal quality of the diversity antenna may be measured by reference signal received quality (RSRQ). In one configuration, to calculate the second set of metrics of the diversity antenna based on the first set of metrics of the primary antenna, the method may provide the first signal strength and the first signal quality of the primary antenna as the second signal strength and the second signal quality of the diversity antenna. In one configuration, the determining and the calculating may be performed in both idle and connected modes.

In an aspect of the disclosure, an apparatus for selective usage of antennas for measurement purposes is provided.

The apparatus may include means for measuring a first set of metrics of a primary antenna. The apparatus may include means for measuring a second set of metrics of a diversity antenna. The apparatus may include means for determining, when at least one metric of the first set of metrics is less than a corresponding threshold, whether at least one difference between the first set of metrics and the second set of metrics satisfies a corresponding criteria. The apparatus may include means for calculating the second set of metrics of the diversity antenna based on the first set of metrics of the primary antenna when the at least one difference is determined to be satisfying the corresponding criteria.

In one configuration, the first set of metrics may include a first signal strength and a first signal quality of the primary antenna, and the second set of metrics may include a second signal strength and a second signal quality of the diversity antenna. In one configuration, the at least one metric may be the first signal strength of the primary antenna and the corresponding threshold may be a signal strength threshold. In one configuration, the at least one metric may be the first signal quality of the primary antenna and the corresponding threshold may be a signal quality threshold.

In one configuration, the at least one difference may be a difference between the first signal strength and the second signal strength, and the corresponding criteria may be a signal strength difference criteria. In such a configuration, the signal strength difference criteria may be determined to be satisfied when the second signal strength of the diversity antenna is stronger than the first signal strength of the primary antenna for more than a signal strength delta threshold.

In one configuration, the at least one difference may be a difference between the first signal quality and the second signal quality, and the corresponding criteria may be a signal quality difference criteria. In such a configuration, the signal quality difference criteria may be determined to be satisfied when the second signal quality of the diversity antenna is stronger than the first signal quality of the primary antenna for more than a signal quality delta threshold.

In one configuration, the first signal strength of the primary antenna and the second signal strength of the diversity antenna may be measured by RSRP, and the first signal quality of the primary antenna and the second signal quality of the diversity antenna may be measured by RSRQ. In one configuration, the means for calculating the second set of metrics of the diversity antenna based on the first set of metrics of the primary antenna may be configured to provide the first signal strength and the first signal quality of the primary antenna as the second signal strength and the second signal quality of the diversity antenna. In one configuration, the means for determining and the means for calculating may operate in both idle and connected modes.

In an aspect of the disclosure, an apparatus for selective usage of antennas for measurement purposes is provided. The apparatus may include a memory. The apparatus may include at least one processor coupled to the memory. The at least one processor may be configured to measure a first set of metrics of a primary antenna. The at least one processor may be configured to measure a second set of metrics of a diversity antenna. The at least one processor may be configured to determine, when at least one metric of the first set of metrics is less than a corresponding threshold, whether at least one difference between the first set of metrics and the second set of metrics satisfies a corresponding criteria. The at least one processor may be configured to calculate the second set of metrics of the diversity antenna based on the first set of metrics of the primary antenna when the at least one difference is determined to be satisfying the corresponding criteria.

In one configuration, the first set of metrics may include a first signal strength and a first signal quality of the primary antenna, and the second set of metrics may include a second signal strength and a second signal quality of the diversity antenna. In one configuration, the at least one metric may be the first signal strength of the primary antenna and the corresponding threshold may be a signal strength threshold. In one configuration, the at least one metric may be the first signal quality of the primary antenna and the corresponding threshold may be a signal quality threshold.

In one configuration, the at least one difference may be a difference between the first signal strength and the second signal strength, and the corresponding criteria may be a signal strength difference criteria. In such a configuration, the signal strength difference criteria may be determined to be satisfied when the second signal strength of the diversity antenna is stronger than the first signal strength of the primary antenna for more than a signal strength delta threshold.

In one configuration, the at least one difference may be a difference between the first signal quality and the second signal quality, and the corresponding criteria may be a signal quality difference criteria. In such a configuration, the signal quality difference criteria may be determined to be satisfied when the second signal quality of the diversity antenna is stronger than the first signal quality of the primary antenna for more than a signal quality delta threshold.

In one configuration, the first signal strength of the primary antenna and the second signal strength of the diversity antenna may be measured by RSRP, and the first signal quality of the primary antenna and the second signal quality of the diversity antenna may be measured by RSRQ. In one configuration, to calculate the second set of metrics of the diversity antenna based on the first set of metrics of the primary antenna, the at least one processor may be configured to provide the first signal strength and the first signal quality of the primary antenna as the second signal strength and the second signal quality of the diversity antenna. In one configuration, the at least one processor may be configured to determine and calculate in both idle and connected modes.

In an aspect of the disclosure, a computer-readable medium storing computer executable code for selective usage of antennas for measurement purposes is provided. The computer-readable medium may include code for measuring a first set of metrics of a primary antenna. The computer-readable medium may include code for measuring a second set of metrics of a diversity antenna. The computer-readable medium may include code for determining, when at least one metric of the first set of metrics is less than a corresponding threshold, whether at least one difference between the first set of metrics and the second set of metrics satisfies a corresponding criteria. The computer-readable medium may include code for calculating the second set of metrics of the diversity antenna based on the first set of metrics of the primary antenna when the at least one difference is determined to be satisfying the corresponding criteria.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
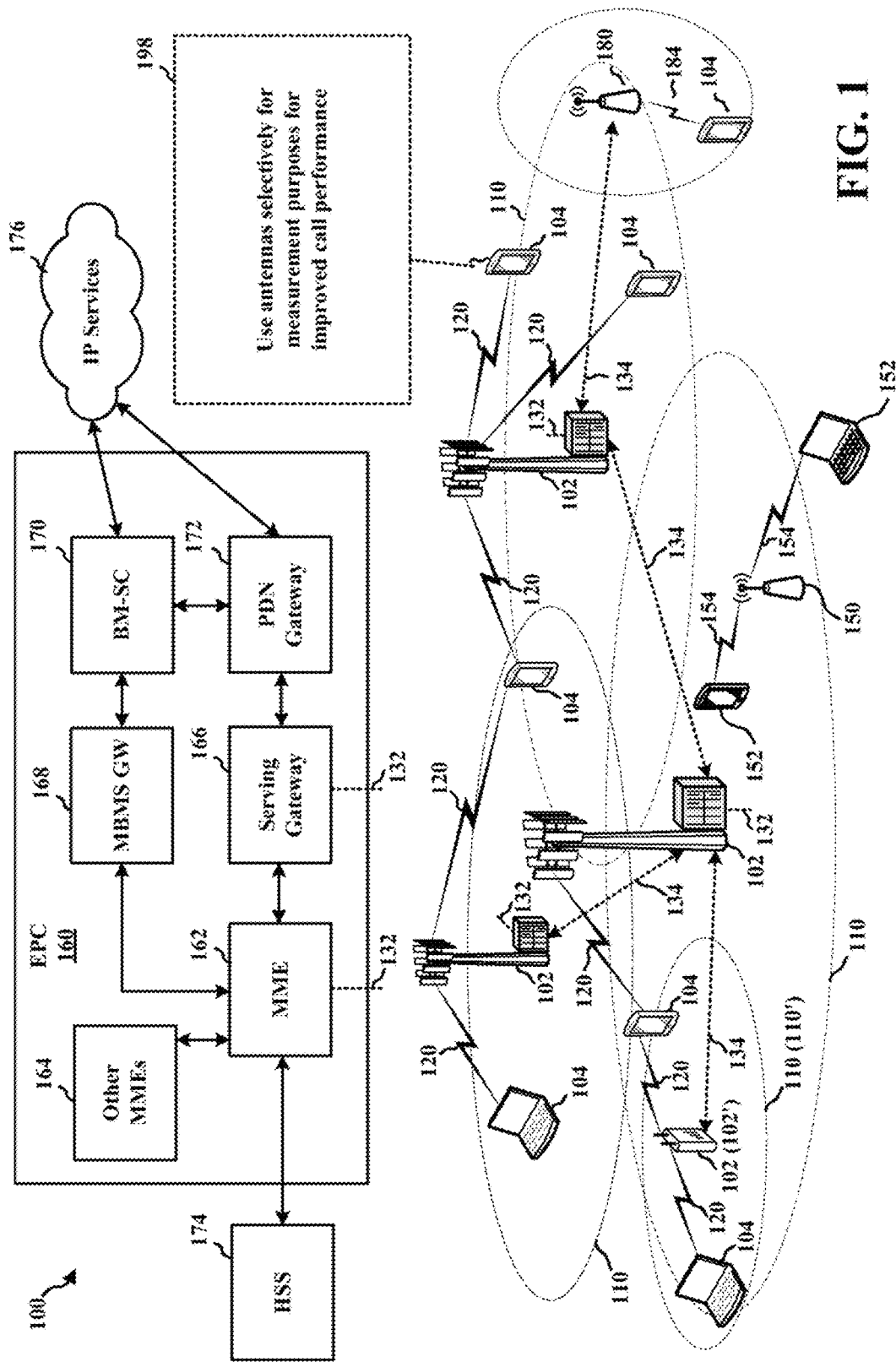
FIG. 1 is a diagram illustrating an example of a wireless communications system and an access network.
Figure 2:
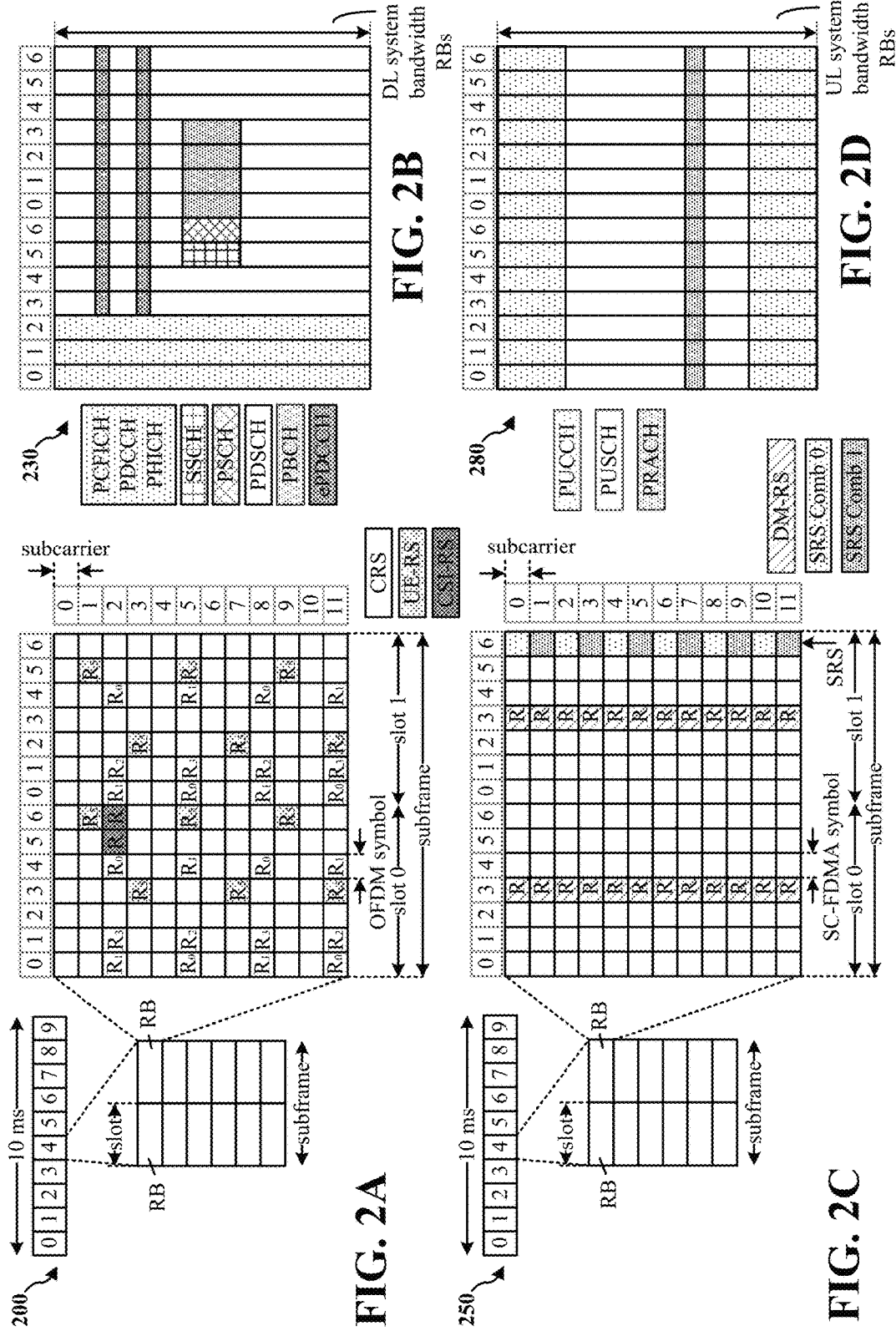
FIGS. 2A, 2B, 2C, and 2D are diagrams illustrating LTE examples of a DL frame structure, DL channels within the DL frame structure, an UL frame structure, and UL channels within the UL frame structure, respectively.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to use (198) antennas selectively for measurement purposes for improved call performance. The operations performed at 198 will be described in detail with reference to FIGS. 2-7.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as R₅), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
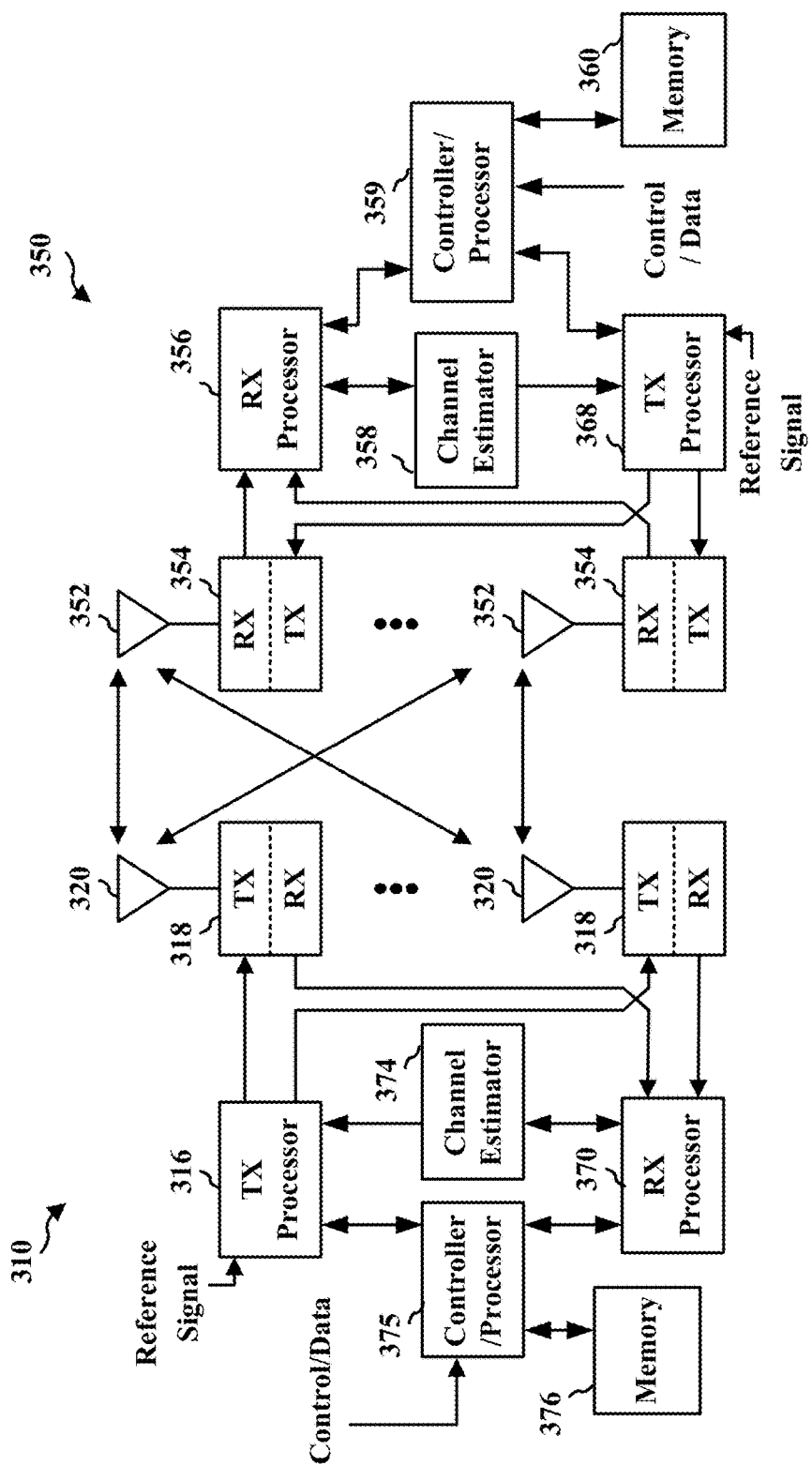
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In one configuration, selective usage of antennas for measurement purposes for improved call performance in weak coverage or antenna-imbalance scenarios is provided. In one configuration, the selective usage of antennas for measurement purposes may not use the antenna switch diversity feature, in which the signal from a first antenna is fed to the receiver for as long as the quality of that signal remains above some prescribed threshold, and a second antenna may be switched in if and when the signal degrades.

In telecommunications, receiver diversity may refer to a method for improving the reliability of a message signal by using two or more communication channels with different characteristics. In the case of wireless transmission, diversity may be achieved by antenna diversity using multiple transmitter antennas (transmit diversity) and/or multiple receiving antennas (reception diversity).

A UE may have a primary antenna (e.g., for RX and TX) and a diversity antenna (e.g., for RX, but not for TX). Poor call performance may result when the UE antennas are not balanced. Per 3GPP Specification 36.214, if receiver diversity is in use by the UE, the reported value shall not be lower than the corresponding reference signal received power (RSRP) of any of the individual diversity branches. In one scenario, the signal received at the primary antenna may be weaker than the signal received at the diversity antenna. The UE may report signal measurements at the diversity antenna in measurement report to eNB. Because the signal received at the diversity antenna is stronger than the signal received at the primary antenna, the UE may get handover to a cell even though the signal received at the primary antenna is weak. In this scenario, the UE may camp on a new cell based on the signal measurements of the diversity antenna. Once camped, the UE may fail uplink communication due to power limitation on the primary antenna. This may result in handover or call failures at cell edge.

Figure 4:
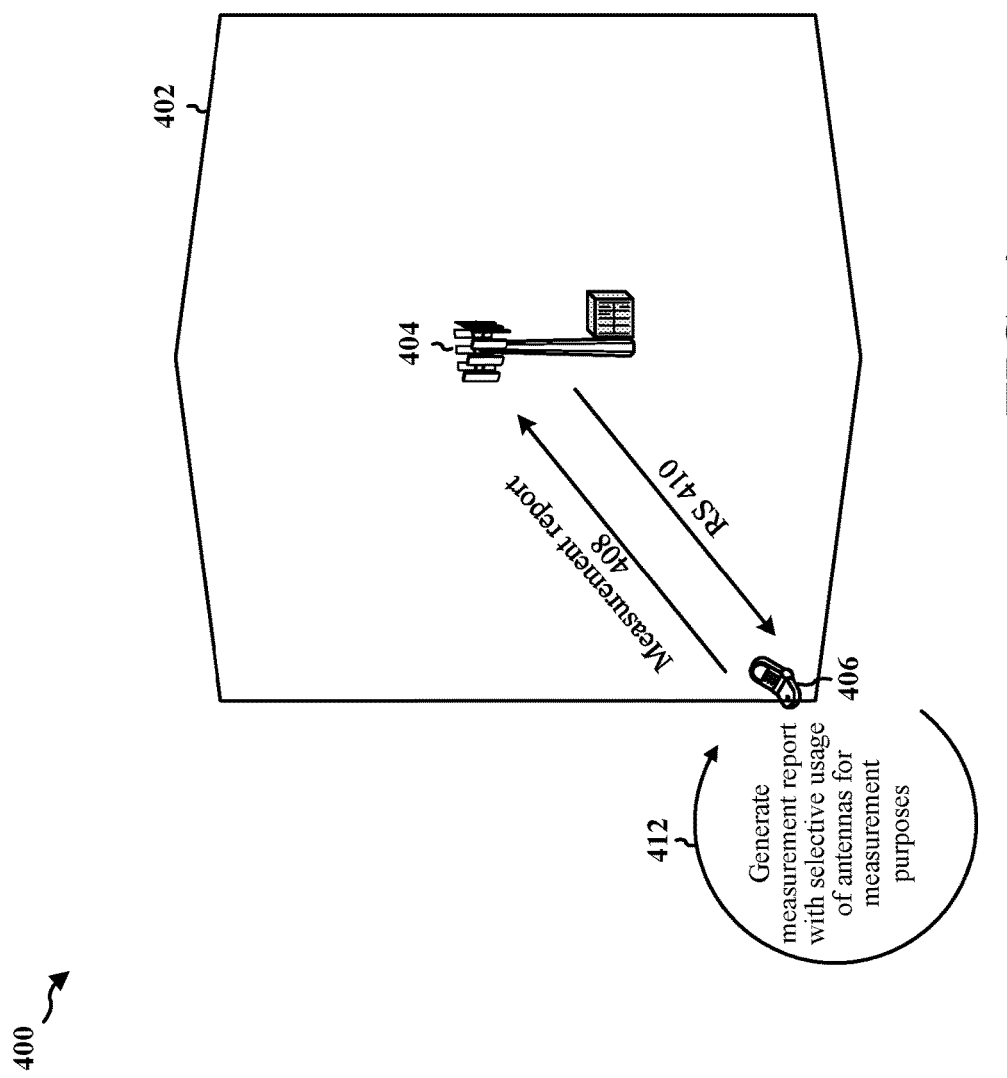
FIG. 4 is a diagram illustrating an example of a UE camping on the best cell with selective usage of antennas for measurement purposes.

FIG. 4 is a diagram 400 illustrating an example of a UE camping on the best cell with selective usage of antennas for measurement purposes. In this example, a UE 406 receives a reference signal 410 from an eNB 404 within a cell 402. The UE 406 may include a primary antenna and a diversity antenna. In one configuration, the UE 406 may be located at the edge of the cell 402.

In one configuration, the UE 406 may measure the received reference signal 410 at both the primary antenna and the diversity antenna of the UE 406. The UE may generate (at 412) a measurement report 408 with selective usage of antennas for measurement purposes. In one configuration, to generate the measurement report 408 with selective usage of antennas, when the signal received at the diversity antenna is stronger than the signal received at the primary antenna by more than a delta threshold, the signal measurements at the primary antenna may be copied to the signal measurements for the diversity antenna for all measurement evaluations and path-loss calculation (including the generation of the measurement report 408). In one configuration, the generation of the measurement report 408 at 412 may correspond to the operations described below with reference to 504, 506, and 508 of FIG. 5.

The eNB 404 receives the measurement report 408 and determines whether the UE 406 selects or reselects, or handover to the cell 402. By allowing the UE 406 to camp on the best cell with selective usage of antennas for measurement purposes, the UE 406 may be pushed out of the cell 402 sooner when the primary antenna is weaker than the diversity antenna, which may be desirable for better user experience. The selective usage of antennas for measurement purposes may not increase camping or scan time. The selective usage of antennas for measurement purposes may not increase power consumption of the UE 406. Downlink decoding performance may not be impacted by the selective usage of antennas for measurement purposes. Furthermore, the operations performed at 412 is not complex to implement.

Figure 5:
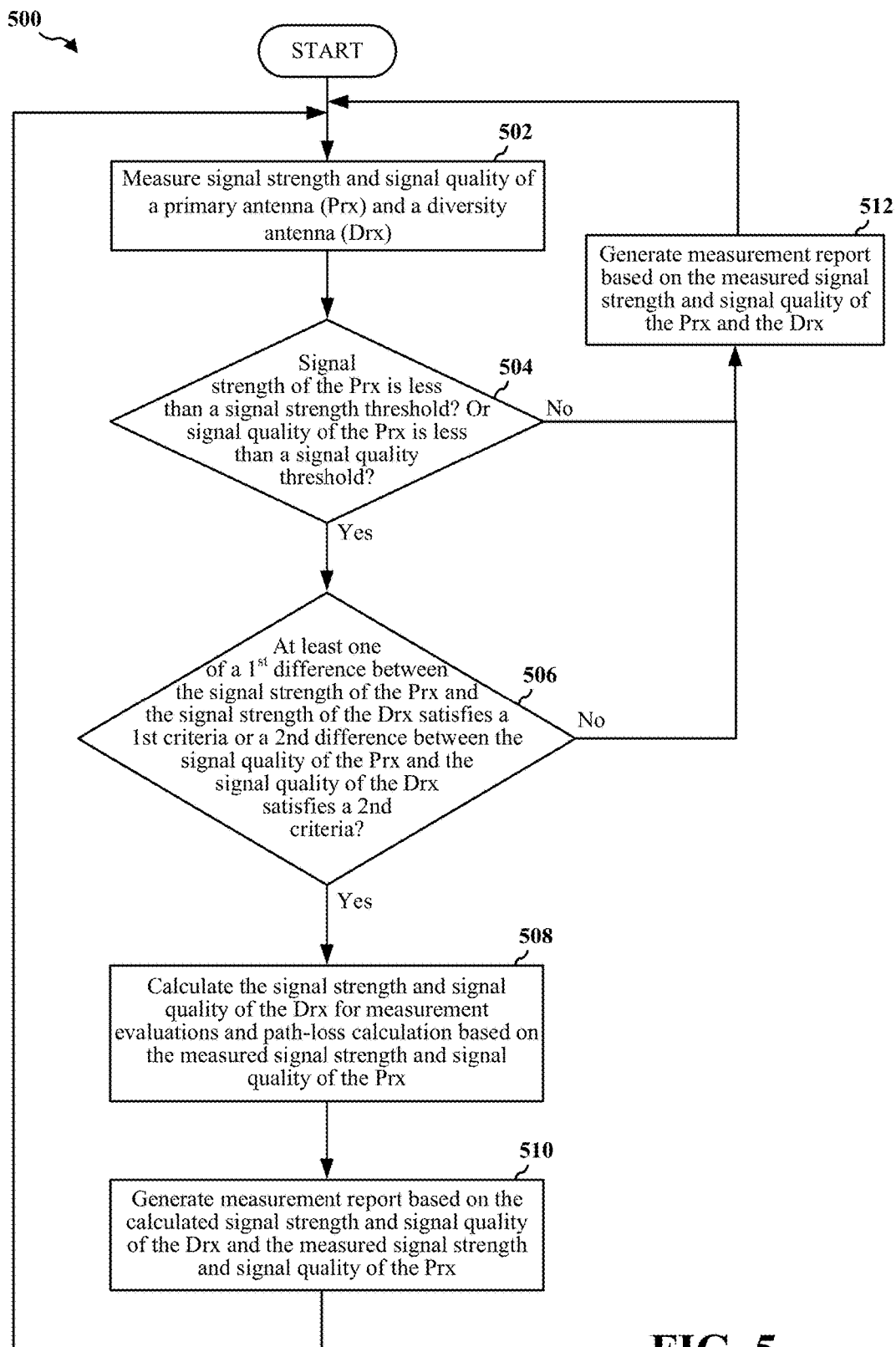
FIG. 5 is a flowchart of a method of wireless communication.

FIG. 5 is a flowchart 500 of a method of wireless communication. The method may be performed by a UE (e.g., the UE 104, 350, 406, or the apparatus 602/602'). In one configuration, the method may correspond to the operations described above with reference to 412 in FIG. 4.

At 502, the UE may measure signal strength and signal quality of a primary antenna (Prx) and a diversity antenna (Drx) of the UE. In one configuration, the signal strength and signal quality of the primary antenna and the diversity antenna may be measured based on the reference signal received by the respective antenna. In one configuration, the signal strength of the primary antenna and the diversity antenna may be measured by reference signal received power (RSRP). In one configuration, the signal quality of the primary antenna and the diversity antenna may be measured by reference signal received quality (RSRQ).

At 504, the UE may determine whether the measured signal strength of the primary antenna is less than a signal strength threshold, or the measured signal quality of the primary antenna is less than a signal quality threshold. If the measured signal strength of the primary antenna is not less than the signal strength threshold and the measured signal quality of the primary antenna is not less than the signal quality threshold, the UE proceeds to 512. If the measured signal strength of the primary antenna is less than the signal strength threshold or the measured signal quality of the primary antenna is less than the signal quality threshold, the UE proceeds to 506.

At 506, the UE may determine whether a first difference between the measured signal strength of the primary antenna and the measured signal strength of the diversity antenna satisfies a first criteria and/or whether a second difference between the measured signal quality of the primary antenna and the measured signal quality of the diversity antenna satisfies a second criteria. If at least one of the first difference satisfies the first criteria or the second difference satisfies the second criteria, the UE proceeds to 508. Otherwise the UE proceeds to 512.

In one configuration, the eNB may configure the UE to determine (at 506) whether one of the first or second criteria is satisfied. In another configuration, the eNB may configure the UE to determine (at 506) whether both the first and second criteria are satisfied. If the condition specified at 506 is satisfied, the UE proceeds to 508. If the condition specified at 506 is not satisfied, the UE proceeds to 512. In one configuration, the operations at 506 may be performed in both idle and connected modes.

In one configuration, in order to determine whether the first difference between the signal strength of the primary antenna and the signal strength of the diversity antenna satisfies the first criteria, the UE may determine whether the signal strength of the diversity antenna is stronger than the signal strength of the primary antenna for more than a signal strength delta threshold. In such configuration, the first criteria may be satisfied when the signal strength of the diversity antenna is stronger than the signal strength of the primary antenna for more than the signal strength delta threshold.

In one configuration, in order to determine whether the second difference between the signal quality of the primary antenna and the signal quality of the diversity antenna satisfies the second criteria, the UE may determine whether the signal quality of the diversity antenna is better than the signal quality of the primary antenna for more than a signal quality delta threshold. In such configuration, the second criteria may be satisfied when the signal quality of the diversity antenna is better than the signal quality of the primary antenna for more than the signal quality delta threshold.

At 508, the UE may calculate the signal strength and signal quality of the diversity antenna for measurement evaluations and path-loss calculation based on the measured signal strength and signal quality of the primary antenna. In one configuration, in order to calculate the signal strength and signal quality of the diversity antenna, the UE may provide the measured signal strength and signal quality of the primary antenna as the signal strength and signal quality of the diversity antenna. In one configuration, operations at 508 may be performed in both idle and connected modes.

At 510, the UE may generate measurement report based on the calculated signal strength and signal quality of the diversity antenna and the measured signal strength and signal quality of the primary antenna. The UE may then loop back to 502.

At 512, the UE may generate measurement report based on the measured signal strength and signal quality of the primary antenna and the diversity antenna. The UE may then loop back to 502.

Figure 6:
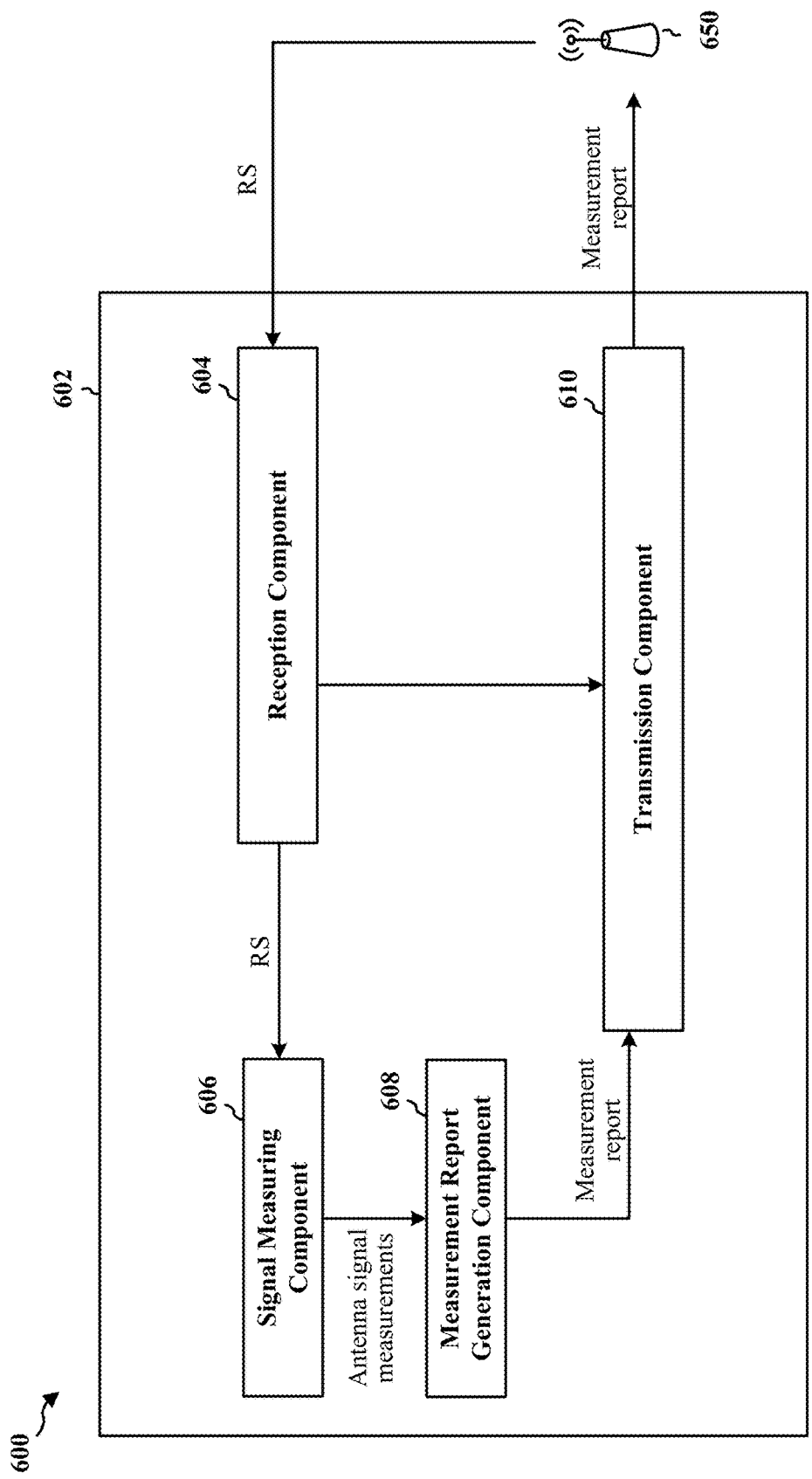
FIG. 6 is a conceptual data flow diagram illustrating the data flow between different means/components in an exemplary apparatus.

FIG. 6 is a conceptual data flow diagram 600 illustrating the data flow between different means/components in an exemplary apparatus 602. The apparatus may be a UE. The apparatus 602 may include a reception component 604 that receives reference signal from an eNB 650. The apparatus 602 may include a transmission component 610 that transmits measurement report to the eNB 650. The reception component 604 and the transmission component 610 may work together to coordinate the communications of the apparatus 602.

The apparatus 602 may include a signal measuring component 606 that measures signal strength and signal quality of the primary antenna and the diversity antenna of the apparatus 602. In one configuration, the signal measuring component 606 may perform operations described above with reference to 502 of FIG. 5.

The apparatus 602 may include a measurement report generation component 608 that generates measurement report based on antenna signal measurements received from the signal measuring component 606. In one configuration, the measurement report generation component 608 may perform operations described above with reference to 504, 506, 508, 510, or 512 of FIG. 5.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
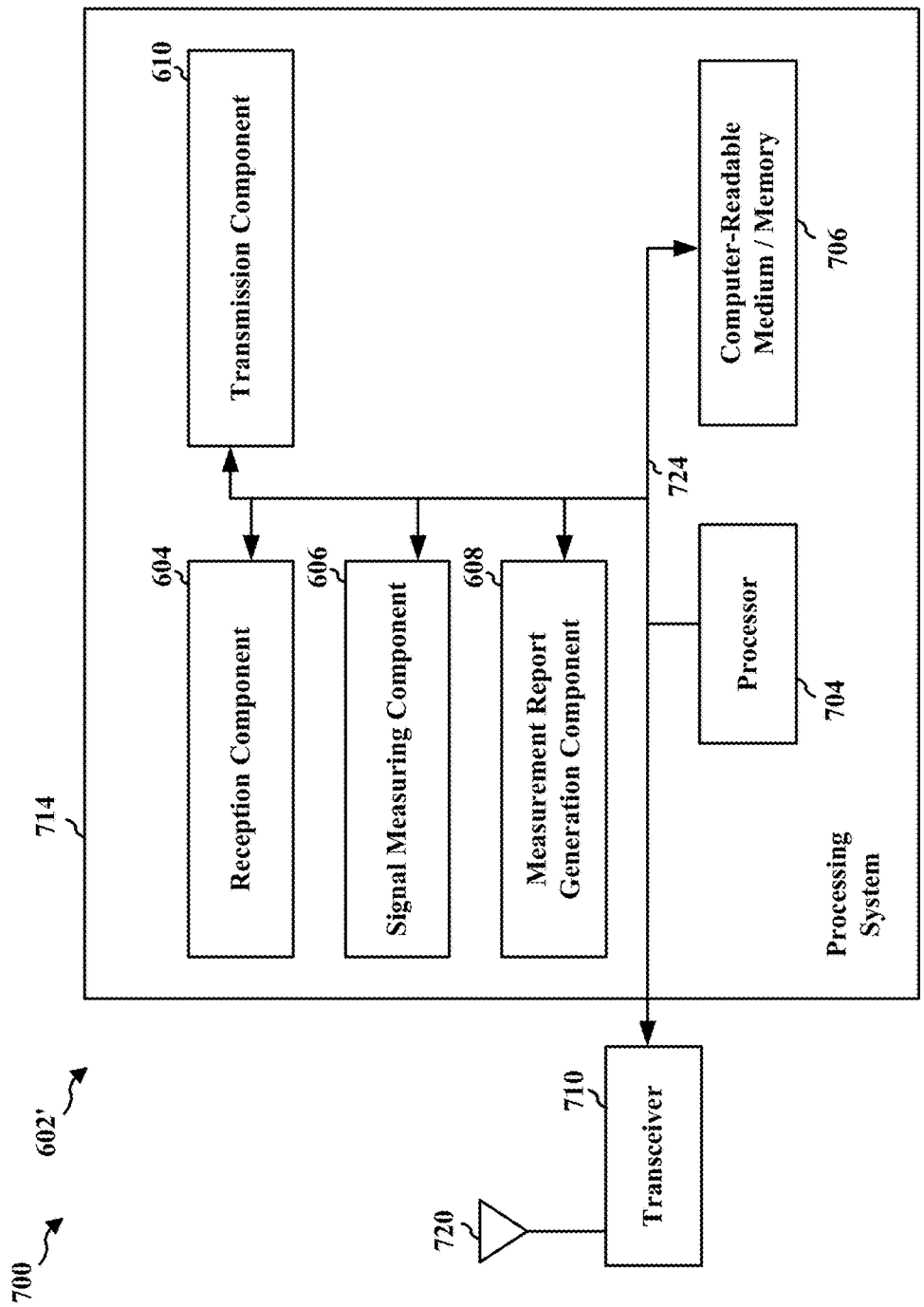
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 610, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359.

In one configuration, the apparatus 602/602' for wireless communication may include means for measuring a first set of metrics of a primary antenna. In one configuration, the means for measuring a first set of metrics of a primary antenna may perform operations described above with reference to 502 in FIG. 5. In one configuration, the means for measuring a first set of metrics of a primary antenna may be the signal measuring component 606 or the processor 704.

In one configuration, the apparatus 602/602' for wireless communication may include means for measuring a second set of metrics of a diversity antenna. In one configuration, the means for measuring a second set of metrics of a diversity antenna may perform operations described above with reference to 502 in FIG. 5. In one configuration, the means for measuring a second set of metrics of a diversity antenna may be the signal measuring component 606 or the processor 704.

In one configuration, the apparatus 602/602' may include means for determining, when at least one metric of the first set of metrics is less than a corresponding threshold, whether at least one difference between the first set of metrics and the second set of metrics satisfies a corresponding criteria. In one configuration, the means for determining may perform operations described above with reference to 504, 506 in FIG. 5. In one configuration, the means for determining may be the measurement report generation component 608 or the processor 704.

In one configuration, the apparatus 602/602' may include means for calculating the second set of metrics of the diversity antenna based on the first set of metrics of the primary antenna when the at least one difference is determined to be satisfying the corresponding criteria. In one configuration, the means for calculating may perform operations described above with reference to 508 in FIG. 5. In one configuration, the means for calculating may be the measurement report generation component 608 or the processor 704. In one configuration, the means for calculating the second set of metrics of the diversity antenna based on the first set of metrics of the primary antenna may be configured to provide the first signal strength and the first signal quality of the primary antenna as the second signal strength and the second signal quality of the diversity antenna. In one configuration, the means for determining and the means for calculating may operate in both idle and connected modes.

The aforementioned means may be one or more of the aforementioned components of the apparatus 602 and/or the processing system 714 of the apparatus 602' configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
measuring a first set of metrics of a primary antenna;
measuring a second set of metrics of a diversity antenna;
determining, when at least one metric of the first set of metrics is less than a corresponding threshold, whether at least one difference between the first set of metrics and the second set of metrics satisfies a corresponding criteria; and
calculating the second set of metrics of the diversity antenna based on the first set of metrics of the primary antenna when the at least one difference is determined to be satisfying the corresponding criteria when a second signal strength of the diversity antenna is stronger than a first signal strength of the primary antenna for more than a signal strength delta threshold or a second signal quality of the diversity antenna is stronger than a first signal quality of the primary antenna for more than a signal quality delta threshold.

2. The method of claim 1, wherein the first set of metrics comprises the first signal strength and the first signal quality of the primary antenna, wherein the second set of metrics comprises the second signal strength and the second signal quality of the diversity antenna.

3. The method of claim 2, wherein the at least one difference is a difference between the first signal strength and the second signal strength, wherein the corresponding criteria is a signal strength difference criteria.

4. The method of claim 2, wherein the at least one difference is a difference between the first signal quality and the second signal quality, wherein the corresponding criteria is a signal quality difference criteria.

5. The method of claim 2, wherein the first signal strength of the primary antenna and the second signal strength of the diversity antenna are measured by reference signal received power (RSRP), wherein the first signal quality of the primary antenna and the second signal quality of the diversity antenna are measured by reference signal received quality (RSRQ).

6. The method of claim 2, wherein the calculating the second set of metrics of the diversity antenna based on the first set of metrics of the primary antenna comprises providing the first signal strength and the first signal quality of the primary antenna as the second signal strength and the second signal quality of the diversity antenna.

7. An apparatus for wireless communication, comprising:
means for measuring a first set of metrics of a primary antenna;
means for measuring a second set of metrics of a diversity antenna;
means for determining, when at least one metric of the first set of metrics is less than a corresponding threshold, whether at least one difference between the first set of metrics and the second set of metrics satisfies a corresponding criteria; and
means for calculating the second set of metrics of the diversity antenna based on the first set of metrics of the primary antenna when the at least one difference is determined to be satisfying the corresponding criteria when a second signal strength of the diversity antenna is stronger than a first signal strength of the primary antenna for more than a signal strength delta threshold or a second signal quality of the diversity antenna is stronger than a first signal quality of the primary antenna for more than a signal quality delta threshold.

8. The apparatus of claim 7, wherein the first set of metrics comprises the first signal strength and the first signal quality of the primary antenna, wherein the second set of metrics comprises the second signal strength and the second signal quality of the diversity antenna.

9. The apparatus of claim 8, wherein the at least one difference is a difference between the first signal strength and the second signal strength, wherein the corresponding criteria is a signal strength difference criteria.

10. The apparatus of claim 8, wherein the at least one difference is a difference between the first signal quality and the second signal quality, wherein the corresponding criteria is a signal quality difference criteria.

11. The apparatus of claim 8, wherein the first signal strength of the primary antenna and the second signal strength of the diversity antenna are measured by reference signal received power (RSRP), wherein the first signal quality of the primary antenna and the second signal quality of the diversity antenna are measured by reference signal received quality (RSRQ).

12. The apparatus of claim 8, wherein the means for calculating the second set of metrics of the diversity antenna based on the first set of metrics of the primary antenna is configured to provide the first signal strength and the first signal quality of the primary antenna as the second signal strength and the second signal quality of the diversity antenna.

13. An apparatus for wireless communication, comprising:
a memory; and
at least one processor coupled to the memory and configured to:
measure a first set of metrics of a primary antenna;
measure a second set of metrics of a diversity antenna;
determine, when at least one metric of the first set of metrics is less than a corresponding threshold, whether at least one difference between the first set of metrics and the second set of metrics satisfies a corresponding criteria; and
calculate the second set of metrics of the diversity antenna based on the first set of metrics of the primary antenna when the at least one difference is determined to be satisfying the corresponding criteria when a second signal strength of the diversity antenna is stronger than a first signal strength of the primary antenna for more than a signal strength delta threshold or a second signal quality of the diversity antenna is stronger than a first signal quality of the primary antenna for more than a signal quality delta threshold.

14. The apparatus of claim 13, wherein the first set of metrics comprises the first signal strength and the first signal quality of the primary antenna, wherein the second set of metrics comprises the second signal strength and the second signal quality of the diversity antenna.

15. The apparatus of claim 14, wherein the at least one difference is a difference between the first signal strength and the second signal strength, wherein the corresponding criteria is a signal strength difference criteria.

16. The apparatus of claim 14, wherein the at least one difference is a difference between the first signal quality and the second signal quality, wherein the corresponding criteria is a signal quality difference criteria.

17. The apparatus of claim 14, wherein, to calculate the second set of metrics of the diversity antenna based on the first set of metrics of the primary antenna, the at least one processor is configured to provide the first signal strength and the first signal quality of the primary antenna as the second signal strength and the second signal quality of the diversity antenna.

18. A non-transitory computer-readable medium storing computer executable code for wireless communication, comprising code for:
measuring a first set of metrics of a primary antenna;
measuring a second set of metrics of a diversity antenna;
determining, when at least one metric of the first set of metrics is less than a corresponding threshold, whether at least one difference between the first set of metrics and the second set of metrics satisfies a corresponding criteria; and
calculating the second set of metrics of the diversity antenna based on the first set of metrics of the primary antenna when the at least one difference is determined to be satisfying the corresponding criteria when a second signal strength of the diversity antenna is stronger than a first signal strength of the primary antenna for more than a signal strength delta threshold or a second signal quality of the diversity antenna is stronger than a first signal quality of the primary antenna for more than a signal quality delta threshold.

* * * * *